May 16, 1933.  C. F. E. OLOFSON  1,909,886
MOTOR CONTROL
Filed Oct. 3, 1928
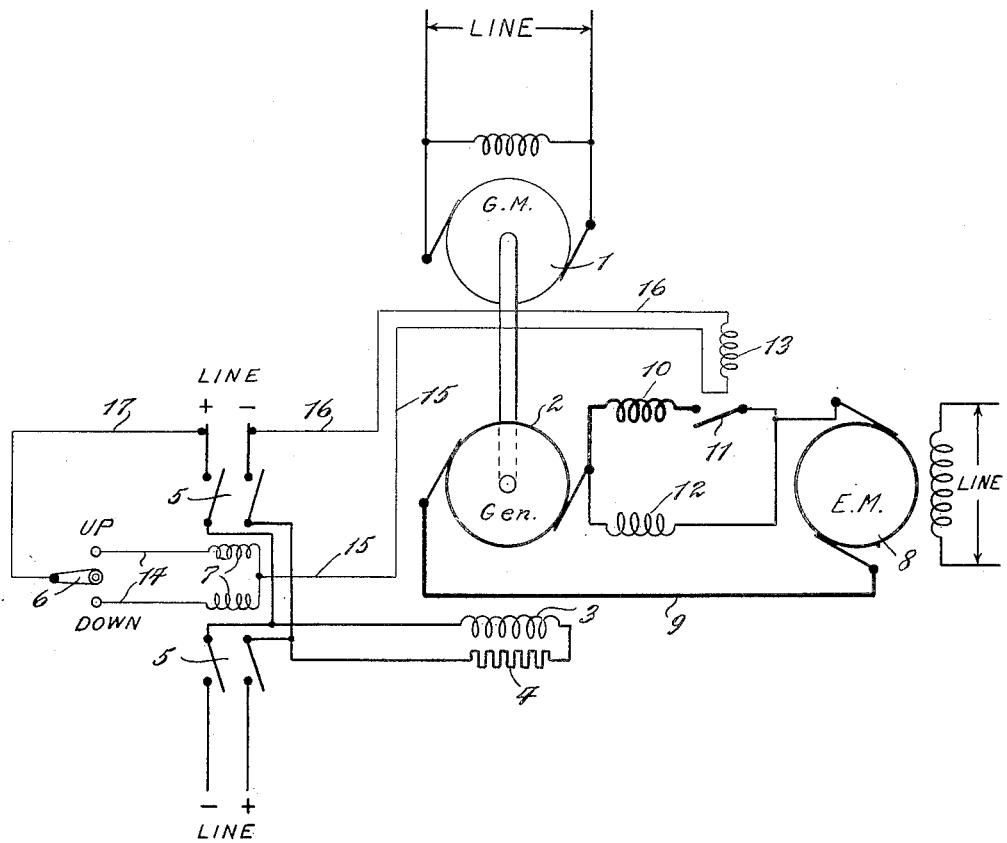
INVENTOR
Carl F. E. Olofson
BY
ATTORNEY Patented May 16, 1933

1,909,886

UNITED STATES PATENT OFFICE

CARL F. E. OLOFSON, OF WEST ORANGE, NEW JERSEY, ASSIGNOR TO A. B. SEE ELEVATOR COMPANY, INC., A CORPORATION OF DELAWARE

MOTOR CONTROL

Application filed October 3, 1928. Serial No. 309,910.

This invention relates to a method and means for controlling the speed of an electric motor, particularly such motors as are used to operate elevators and the like. Motors customarily receive energy from a separately excited variable voltage generator which has its armature connected in series with the armature of the motor. This generator may be driven from any suitable external source usually another motor. The elevator motor is also usually separately excited in order that its speed may be a function directly of the voltage impressed across its armature. In such installations the generator is continuously driven at a constant speed and the output voltage thereof is controlled by regulating its separately excited field. If it is desired to slow down the elevator motor the field of the generator is varied accordingly and if it is desired to change the rotation of the elevator motor, and polarity of the current through the field of the generator is reversed by the usual reversing switches. When it is desired to stop the elevator motor the field circuit of the generator is opened. However, there is always some residual magnetism in the field and consequently through the generator and since the generator is being continuously driven the output voltage of the generator does not drop immediately to zero. For this reason the elevator motor which receives its current from the generator armature does not stop immediately upon opening the field circuit of the generator. In elevator installations and particularly in those installations known as the full automatic systems, it is highly desirable, if not necessary, that the elevator car be brought to a stop exactly at the desired floor level. This requires that the elevator motor driving the car be brought to a standstill immediately upon the opening of the control switch in order that there be no drift past the desired floor level.

It is the object of this invention to provide means for accurately controlling an elevator motor in order that an elevator car driven thereby may be brought exactly to a floor level. It is also the purpose of this invention to provide means for accurately controlling the elevator motor in such a manner that the elevator car driven thereby is brought to an accurate landing without jarring or jolting the occupants of the car.

These desired features are obtained by providing means for eliminating the effect of the residual magnetic flux of the generator supplying current for the elevator motor. In the illustrated embodiment of this invention this is accomplished by placing a field winding in the armature connections which field winding is operative to produce a magnetic flux in opposition to the residual or normal field flux of the generator whenever the field circuit of the generator is opened. This auxiliary field therefore serves the two-fold purpose of eliminating the effects of the residual magnetism to cause the voltage across generator armature to drop to zero instantly upon opening the separately excited field circuit and also to establish a relatively reversed flux which will tend to set up a reversed current through the generator and the motor armatures thereby braking the elevator motor.

A better understanding of the invention will be had from the detailed description which follows, taken in connection with the drawing which is a diagrammatic illustration of an embodiment of this invention.

In the illustrated embodiment of this invention there is shown a generator motor 1 receiving current from any convenient line source and directly connected to a generator 2, the shunt field 3 of the generator being separately excited by the usual connections to a convenient line source through a resistance 4 and the usual reversing switches 5. The reversing switches 5 are adapted to be controlled from the elevator car by means of a manually operable switch 6 and the relays 7, as is customary in modern elevator systems. Such a control is indicated in the drawing and further description thereof is not deemed necessary. The armature of generator 2 is connected in series with the armature of an elevator motor 8, the field of the latter being separately excited. The armature connections between the generator and elevator motor comprise a conductor 9 connecting one armature terminal of the generator directly to one armature terminal of the elevator motor. The other terminal of the generator motor is connected to the second terminal of the elevator motor by two currents constituting two parallel current paths, one of which includes the usual compound series field 10 and a switch 11 in series therewith, the other path including a relatively reversely wound series field 12. Switch 11 is controlled by a relay 13 which is electrically connected in series with the controlling relays 7 and switch 6 and across the line source by conductors 14, 15, 16 and 17 in such a manner that switch 11 is only closed when the controlling switch 6 is either in the up or down position and is opened whenever reversing switches 5 and consequently the field circuit 3 of the generator are open. The generator and elevator motor armatures are always electrically interconnected through conductor 9 and field winding 12 regardless of the position of reversing switches. The armatures also being connected through the usual series field 10 and switch 11 whenever either of the reversing switches are closed.

The operation of the system is as follows: When the operator of the elevator throws the switch 6 to cause the elevator to travel either up or down as the case may be, relays 7 and 13 are energized thus closing one set of reversing switches and switch 11 and the field of the generator will be energized. The usual reversing switches are indicated but not described in detail since such mechanism is well known to the art. The generator will therefore develop an induced voltage across its armature and energize the elevator motor through the normal armature connections comprising conductor 9, series field 10 and switch 11 causing the elevator motor to drive the elevator car through the usual mechanism not shown. A small current may also flow through the reversed field winding 12 but it is obvious that the relative resistances of the two field windings 10 and 12 will be such that a very little current, if any, will flow through the winding 12. In this connection it will be realized that the winding 12 can have a relatively high resistance inasmuch as its purpose is only to neutralize or compensate for the residual magnetic flux of the generator. Winding 10 on the other hand is the usual series winding of a compound generator and necessarily must be of low resistance since it comprises the main path for the armature current. Whenever the operator desires to bring the elevator to a stop he opens switch 6, thereby disconnecting relays 7 and 13 from the line and consequently opening either of the reversing switches 5 which was closed and switch 11. Opening the reversing switches opens the field winding 3 thereby killing the main field flux of the generator. Opening switch 11 opens the main armature path but an auxiliary or parallel path still remains closed through the compensating winding 12 which winding will establish a flux through the generator, since the generator is still rotating at its normal speed, in opposition to the residual flux of the generator which flux will cause the voltage across the generator armature to drop instantly. The killing of the residual flux and the tendency to build up a reversed flux will have a braking effect upon the motor since the tendency will be to establish a current in a reversed direction through the motor armature.

It is obvious that various minor changes may be made in the connections, for example: Switch 11 and reversing switches 5 may be interconnected in any suitable manner not necessarily as shown in the illustrated embodiment of this invention without departing from the spirit and scope of this invention as defined by the claims appended hereto. It is also apparent that the relative values of the two series fields may be varied to suit particular needs.

I claim:

1. In an electric elevator, an elevator motor for operating the same, a variable voltage generator having a separately excited field for operating said motor, electrical connections between the armatures of said generator and motor, said connections including two parallel current paths, a switch in one of said paths and means in the other of said paths for establishing a magnetic flux in said generator in opposition to the residual flux thereof.

2. In an electric elevator, an electric motor for operating the same, a variable voltage generator having a separately excited field for operating said motor, reversing switches for reversing the polarity of current supplied to said field, electrical connections between the armatures of said generator and motor, said connections including two parallel current paths, a switch in one of said paths and means in the other of said paths for establishing a magnetic flux in said generator in opposition to the residual flux thereof and means for simultaneously operating said switches to simultaneously open said field circuit and one parallel current path.

3. In an electric elevator, an elevator motor for operating the same, a compound wound variable voltage generator having a separately excited shunt field for operating said motor, electrical connections between the armatures of said generator and motor, said connections including two relatively reversely wound series field windings affecting the generator, and a switch for opening one of said series field windings.

4. In an electric elevator, an elevator motor for operating the same, a compound wound variable voltage generator having a separately excited shunt field for operating said motor, reversing switches for reversing the polarity of current in said field, electrical connections between the armatures of said generator and motor, said connections including two relatively reversely wound series field windings for the generator, a switch for opening one of said series field windings, and means for simultaneously operating said switches.

5. In an electric elevator system, an electric motor, a generator for supplying current to the motor, electrical connections between the motor and the generator including two relatively reversely wound generator field windings, connected in parallel, one of said windings having a greater resistance than the other, and a switch for cutting one of said field windings out of the circuit.

6. In an electric elevator system, an electric motor, a generator for supplying current to the motor, eletrical connections between the motor and the generator including two relatively reversely wound generator field windings connected in parallel, one of said windings having a greater resistance than the other, and means for opening the circuit to the winding of lesser resistance.

7. In an electric elevator system, an electric motor, a variable voltage generator having a separately excited field for supplying current to the motor, reversing switches for reversing the polarity of the current supplied to said field, electrical connections between the armatures of the generator and the motor, the connections including two relatively reversely wound generator fields connected in parallel, one of said windings having a greater resistance than the other, a switch in the circuit including the winding of lesser resistance, and means for simultaneously operating said switches.

In witness whereof, I hereunto subscribe my signature.

CARL F. E. OLOFSON.